Patented May 4, 1926.

1,583,229

UNITED STATES PATENT OFFICE.

HENRI GEORGE, OF PARIS, FRANCE, ASSIGNOR TO SOCIÉTÉ ANONYME "QUARTZ & SILICE," OF PARIS, FRANCE, A CORPORATION OF FRANCE.

METHOD OF MANUFACTURE OF ARTICLES IN FUSED SILICA.

No Drawing. Application filed December 23, 1924. Serial No. 757,772.

*To all whom it may concern:*

Be it known that I, HENRI GEORGE, a citizen of the French Republic, residing at Paris, France, have invented certain new and useful Improvements in Methods of Manufacture of Articles in Fused Silica, of which the following is a specification.

It is known that pure fused silica possesses in a high degree the electrical, mechanical and thermal qualities necessary for an insulating material intended in particular for the manufacture of insulators.

On the other hand, the present processes for the manufacture of silica do not permit of obtaining articles of any considerable size with the accuracy of shape, the finish of the surface and the regularity of the vitrification which are indispensable for an insulator of quality suitable for high tensions.

In practice the fashioning of the articles is effected by drawing, moulding or compression of a hollow cylindrical blank obtained in the following manner:—

The primary material is heaped into a furnace around a carbon electrode; this electrode is carried to a high temperature by the passage of the current; the silica melts all round the electrode and the operation is stopped when the blank has attained the desired diameter.

In these conditions the interior part of the blank which was in contact with the electrode is perfectly fused and vitrified, whilst in the thickness of its wall there are obtained all the intermediate stages between perfect vitrification and mere agglomeration of the particles of silica constituting the primary material.

Consequently articles of silica made with these blanks have an irregular shape; their surface is rough and often presents a certain porosity for a small thickness, which renders them unsuitable in this form for any electrical use. In order to obviate this disadvantage, recourse is sometimes had to a superficial re-melting of the article. This process is particularly onerous and can only be applied to articles of small size intended for the laboratory.

Hitherto it has been supposed that fused silica could not be fashioned and polished except by wear, by the aid of abrasive materials, by operations of grinding, dressing and polishing as employed for glass.

Contrary to what would be expected, it has been ascertained by the inventor that fused silica can be machined under conditions altogether comparable with the case of metal articles, there being of course employed tools of suitable hardness. The inventor has even ascertained that the articles can be reduced in size very rapidly by turning at high speed with heavy cuts and that machining times can be attained of the same order as those which would correspond to articles made of steel.

The present invention which is based upon this observation, consists in employing the direct action of the tool of a machine for fashioning blanks of fused silica obtained in the electric furnace or articles prepared from these blanks, in such a way as (1) to rectify their shapes and dimensions with rigorous accuracy, allowing interchangeable parts to be obtained, and (2) to remove by machining over the whole surface of the articles a sufficient thickness of material to reach the zone in which the product is perfectly vitrified and homogeneous.

For the machining of the silica there can be employed, subject to necessary modifications for the mounting of the special tools, ordinary machine tools such as lathes, milling machines, planers, drilling machines, etc.

The materials lending themselves best to the constitution of the tools have a base of diamond, carborundum, corundum, etc., or of any other substance having a hardness equal or superior to seven in the Mohs scale. The grinding wheels, drills or tools of special shape are constituted of these materials according to the work to be executed. The best results are obtained with grinding wheels revolving at suitable speed in front of the article, which itself receives a movement of rotation (as in rectifying machines).

If the speeds, the hardness of the grinding wheel and its grain are chosen in accordance with the known rules of the art, there are obtained directly silica articles having a surface which is perfectly smooth, brilliant and polished, being analogous (in the case of opaque silica) to that of polished white marble.

Experience shows that these surfaces possess a superficial resistivity analogous to that of the superficially re-melted product, which renders them suitable for electro-technical uses, especially as insulators for high tension lines. There can be manufactured also by this process articles of great precision. The indilatability of silica allows of constructing in this way standards of length and measure the dimensions of which remain constant whatever be the temperature.

What I claim is:

1. A method for manufacturing articles of fused silica intended, more particularly for electro-technical uses, comprising shaping the articles by the direct action of machine tools of suitable hardness, mounted in a tool carrying machine.

2. A method for manufacturing articles of fused silica intended, more particularly for electro-technical uses, comprising shaping the articles by the direct action of machine tools of suitable hardness, mounted in a tool carrying machine, the articles being shaped to exact dimensions by the machine tool, and then giving the shaped article a smooth polished surface analogous to polished marble.

3. In manufacturing fused silica articles, machining the articles with a machine tool, to exact dimensions and then giving the machined articles a perfectly smooth, polished surface.

In testimony whereof I have signed my name to this specification.

HENRI GEORGE.